US006382749B1

(12) United States Patent
Stetson

(10) Patent No.: US 6,382,749 B1
(45) Date of Patent: May 7, 2002

(54) CABINET

(76) Inventor: Steve A. Stetson, 1180 Eugenia Pl., Suite 104, Carpenteria, CA (US) 93103

( * ) Notice: Subject to any disclaimer, the term of this patent is extended or adjusted under 35 U.S.C. 154(b) by 0 days.

(21) Appl. No.: 09/215,066

(22) Filed: Dec. 17, 1998

(51) Int. Cl.[7] ............................................... A47B 88/00
(52) U.S. Cl. ...................... 312/308; 312/316; 312/322
(58) Field of Search ............................... 312/245, 246, 312/201, 248, 328, 276, 308, 309, 324, 278, 322

(56) References Cited

U.S. PATENT DOCUMENTS

| 1,239,937 A | * | 9/1917 | Mosman | 312/315 |
| 1,379,228 A | * | 5/1921 | Swift | 312/245 |
| 1,698,981 A | * | 1/1929 | Ackerman | 312/316 |
| 2,191,116 A | * | 2/1940 | Osuch | 312/278 |
| 4,245,871 A | | 1/1981 | Rex | |
| 4,827,439 A | | 5/1989 | Licht | |
| 4,861,121 A | | 8/1989 | Gotz | |
| 5,281,018 A | | 1/1994 | Cullinan | |
| 5,460,101 A | | 10/1995 | Garbutt, Sr. | |

FOREIGN PATENT DOCUMENTS

| DE | 2020966 | * 11/1971 | ................. 312/328 |

* cited by examiner

Primary Examiner—Peter R. Brown
Assistant Examiner—Jerry A. Anderson
(74) Attorney, Agent, or Firm—Leo F. Costello

(57) ABSTRACT

A wall-mounted cabinet that is especially adapted for use as a security cabinet in a security system includes the cabinet and the equipment secured by the cabinet in such a manner that the system does not rely on surveillance by security personnel. The cabinet includes a housing with a back support panel securely fastened to a wall of the building that is being monitored. The panel fits around cables used to power or otherwise electrically service the equipment. The housing also has top, bottom and side panels projecting outwardly from the back panel, and shelves are located within the housing defining an upper and lower compartments. Upper and lower doors are mounted on the housing for movement between open and closed positions over the compartments, and locks on the doors secure the doors in their closed positions. Fasteners join the panels of the housing together so that access from the exterior of the cabinet when locked is prevented short of destroying the cabinet. The monitoring equipment includes a TV monitor or display secured to the top of the housing; recording equipment supported on an upper shelf in the upper compartment; video tapes supported on lower shelves in the lower compartment; electrical connections enclosed by the cabinet and including cables extending from the equipment out of the cabinet through the back and either extending through the wall or connected to power outlets in the wall; and a cooling fan mounted in the cabinet for cooling the equipment.

17 Claims, 17 Drawing Sheets

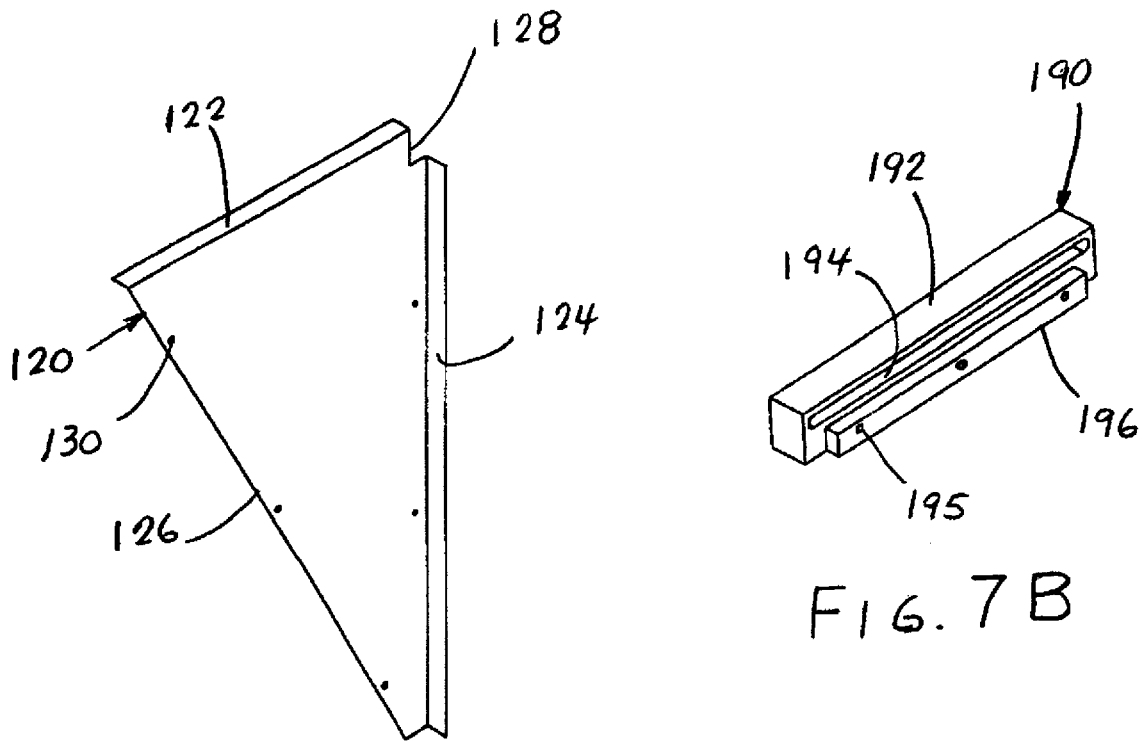
FIG. 7A
FIG. 7B
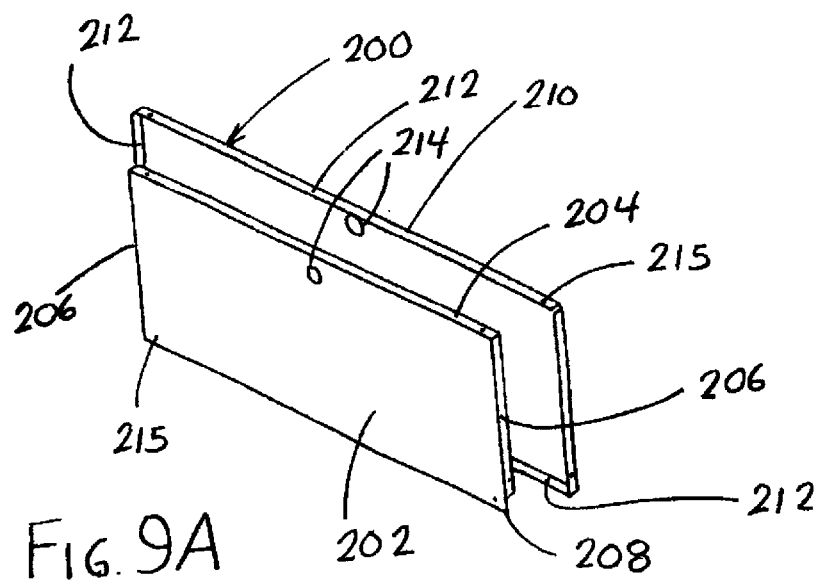
FIG. 9A

CABINET

FIELD OF THE INVENTION

The present invention pertains to a cabinet a wall-mounted cabinet that is especially adapted for use as a security cabinet.

BACKGROUND

A small business, such as a convenience store, a market, a hardware store, or other retail business, usually cannot afford security personnel and must rely solely upon various types of monitoring equipment to record activities detrimental to the security of its business including its merchandise and records. Without attending personnel, however, the components of security systems currently in use for small businesses are often vulnerable to tampering or theft.

Commonly used security systems typically include video cameras mounted at various locations around an establishment and connected by coaxial cables to monitoring equipment located at some convenient place in the building, which for a small business usually is a corner of the manager's office, a closet, or sometimes even fully exposed on a shelf behind the cash register. The monitoring equipment generally includes a video monitor, a video tape recorder, a multiplexer, a power source or supply, a storage area for videotapes, and the necessary electrical connections. As stated, such monitoring equipment will most likely not be under the surveillance of security personnel, such as might be stationed in the lobby of a larger commercial or industrial enterprise, but must depend on the owner's or manager's infrequent inspections for the integrity of the system.

Efforts are sometimes made to protect the monitoring area by placing the video tape recorder in a box that is locked and rests on a table. The video monitor is usually placed on top of the box, and the videotapes are often stored on some shelf or simply placed on the table next to the box containing the videotape recorder. Experience shows that these measures offer no security at all since the power cord or cables leading to the VCR and other equipment can readily be unplugged or cut, and the locked box, including its contents, can be stolen. Of course, the exposed videotapes, perhaps containing damaging evidence of illegal activities, can likewise be stolen or compromised.

SUMMARY

A wall-mounted cabinet is disclosed that is especially adapted for use as a security cabinet in a security system. System includes a cabinet and the equipment secured by the cabinet in such a manner that the system does not rely on surveillance by security personnel. The cabinet includes a housing with a back support panel securely fastened to a wall of the building that is being monitored. The panel fits around cables used to power or otherwise electrically service the equipment. The housing also has top, bottom and side panels projecting outwardly from the back panel, and shelves are located within the housing defining an upper and lower compartments. Upper and lower doors are mounted on the housing for movement between open and closed positions over the compartments, and locks on the doors secure the doors in their closed positions. Fasteners join the panels of the housing together so that access from the exterior of the cabinet when locked is prevented short of destroying the cabinet. The monitoring equipment includes a TV monitor or display secured to the top of the housing; recording equipment supported on an upper shelf in the upper compartment; video tapes supported on lower shelves in the lower compartment; electrical connections enclosed by the cabinet and including cables extending from the equipment out of the cabinet through the back and either extending through the wall or connected to power outlets in the wall; and a cooling fan mounted in the cabinet for cooling the equipment.

An object of this invention is to provide a wall-mounted cabinet that is especially adapted for use as a security cabinet.

An object of this invention is to provide an improved security system, particularly suited for use by small businesses.

Another object is to provide a more effective security system for an establishment where security personnel are not employed or at least are not in constant attendance to the security equipment.

An additional object is to provide a security system for monitoring the activities in a retail business establishment, or other small enterprise, wherein tampering with the security equipment or stealing it is made much more difficult.

A specific object is to make it much more difficult to steal the most crucial equipment of a security system, i.e., the videotape recorder and videotapes.

Yet another object is to house the monitoring equipment of a security system in such a manner that it is concealed, locked, and fastened to the building in which it is used.

A further object is to provide a security cabinet for the critical monitoring equipment of a security system that is so difficult to enter when closed and locked that would-be thieves will either be discouraged from tying or will fail and perhaps be noticed if attempts at entry are made.

An added object to house the critical equipment of a video monitoring security system in a common secure housing that is securely attached to the building being monitored so that the equipment cannot simply be carried away or easily compromised.

A still further object is to conceal in a secure locked cabinet all of the critical parts of the recording equipment of a video monitoring system including a VCR, video tapes, cables, and power sources and to attach the TV monitor of the system to the cabinet so that the monitor cannot be separated from the cabinet from the outside of the cabinet without destruction of the installation.

A further object is to provide a secure enclosure for the monitoring equipment of a security system while allowing convenient access to this equipment for servicing or other attention.

Yet an additional object is to provide a security cabinet for the monitoring equipment of a security system that has the appearance of another piece of furniture, thereby to compliment the accessories in the office or building.

An additional object is to secure the monitoring equipment of a security system so that it will withstand earthquake or accidental bumping, thereby to protect the equipment housed and also to avoid injury from falling objects.

A still further object is to provide a security cabinet that can be shipped in disassembled condition but that can be quickly and easily assembled and installed, ready for use.

These and other objects will become apparent upon reference to the following description and claims and to the accompanying drawings.

DESCRIPTION OF THE DRAWINGS

FIG. 7A is an isometric view of a side panel insert also seen in FIG. 2.

FIG. 7B is a isometric view of one of the lower door mounts also seen in FIG. 2.

FIG. 9A is an exploded isometric of the two parts of the upper front door of the cabinet.

DETAILED DESCRIPTION

Figure 1:
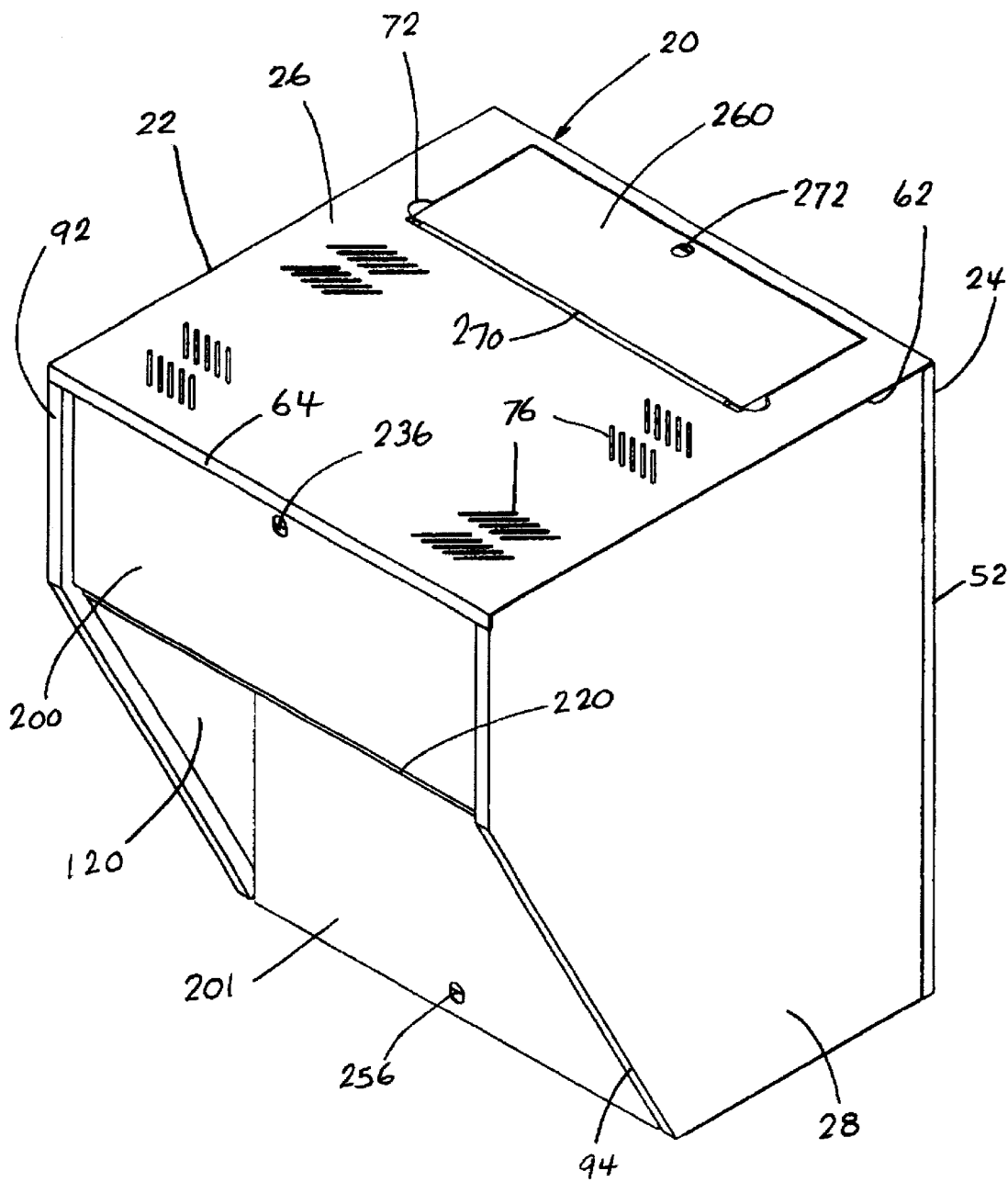
FIG. 1 is a front isometric view from a vantage point looking down on the right upper front corner of the security cabinet of the present invention shown with all three of its doors closed.

The security cabinet of the present invention is generally indicated by the numeral 20 in the drawings and is shown in its painted condition in all the views, the significance to be subsequently explained. The cabinet is made of metal, preferably steel, although other strong, rigid materials could be used. As best seen in FIG. 1, the cabinet includes a housing having a back panel 24, a top panel 26, side panels 28 and 30, and a bottom panel 32. Although the subject invention is not limited to any particular dimensions, the preferred embodiment of the cabinet is about twenty-six inches high by about twenty-one inches wide by about twenty-one inches deep at the top and about twelve inches deep at the bottom.

Figure 2:
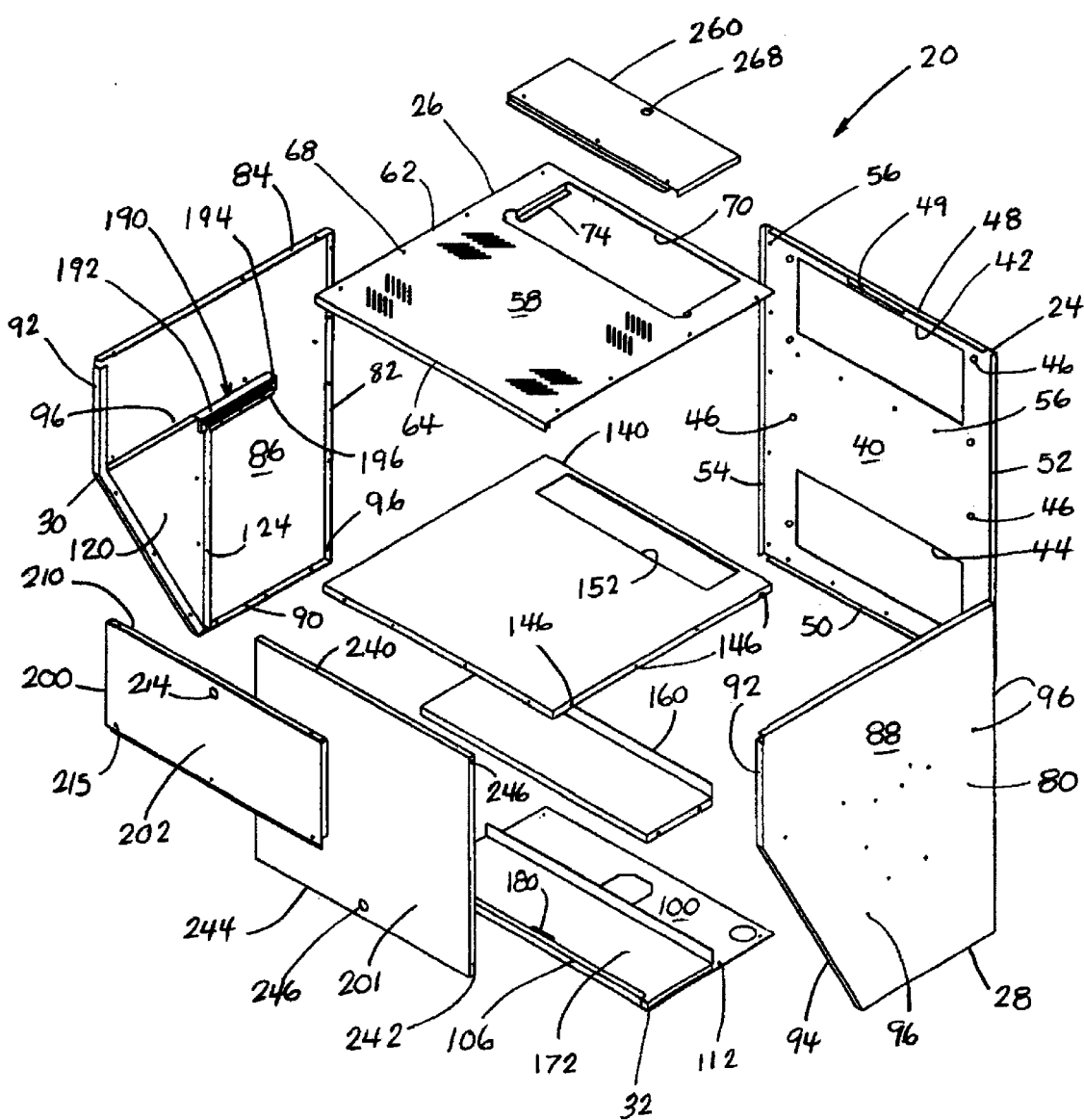
FIG. 2 is an exploded view of the security cabinet shown in FIG. 1.
Figure 3:
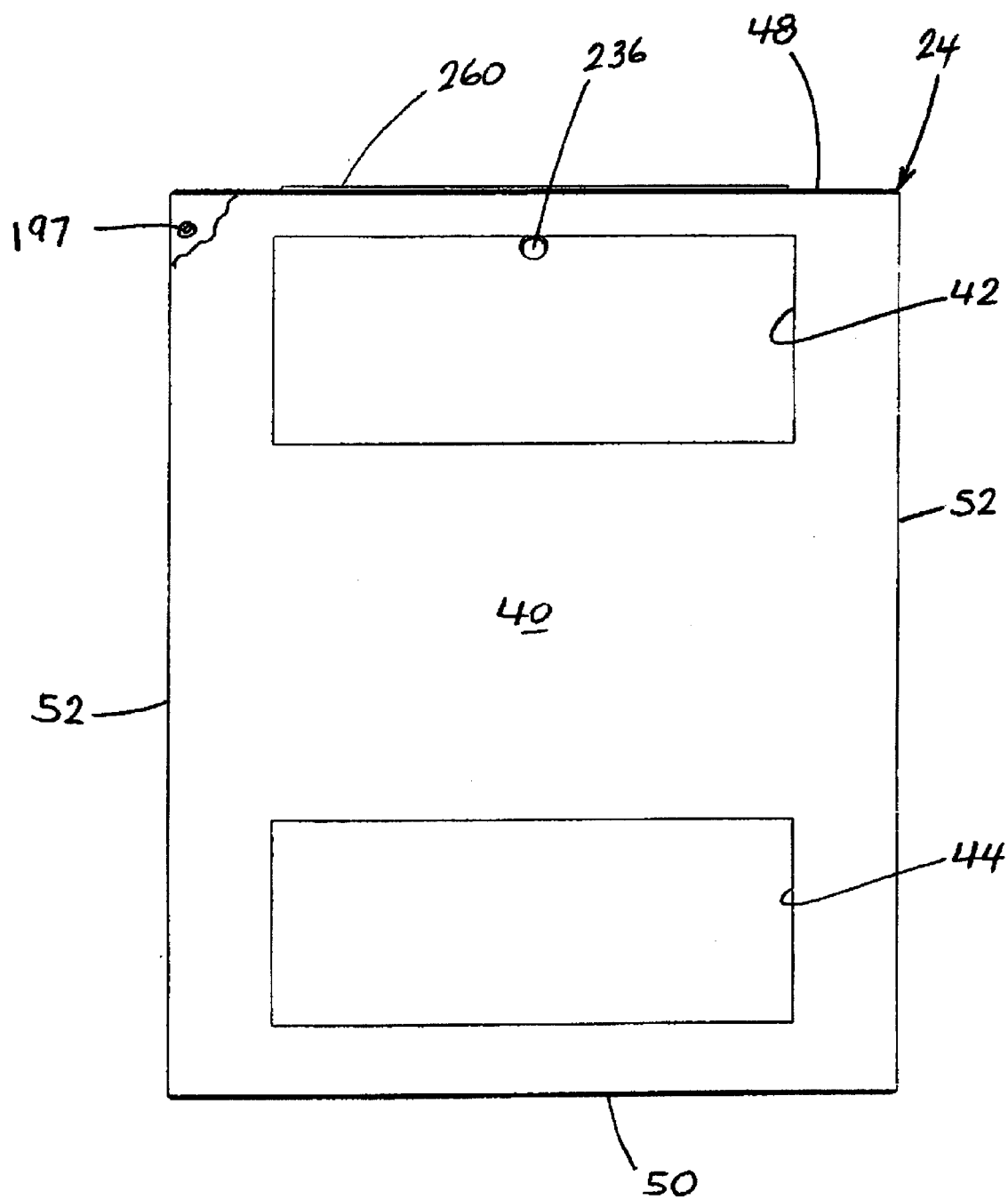
FIG. 3 is a rear elevation of the security cabinet of FIG. 1 with a part broken away to show a fastener.

The back panel 24 (FIGS. 2 and 3) is substantially square in shape and has a height and width the same as the housing 22. The back panel includes a flat central portion 40 having a rectangular upper cable opening 42, a rectangular lower cable opening 44, and a series of mounting holes 46, preferably four, adjacent to the opposite sides of the cable openings. As best seen in FIG. 2, the back panel has horizontal, inwardly extending top and bottom flanges 48 and 50 and vertical, inwardly extending side flanges 52 and 54. A vertical locking flange 49 extends down from the top flange centrally thereof on the inside of the panel. Both the top and bottom flanges as well as the central portion of the back panel have assembly holes 56, although not all the assembly holes are shown for illustrative convenience.

Figure 4:
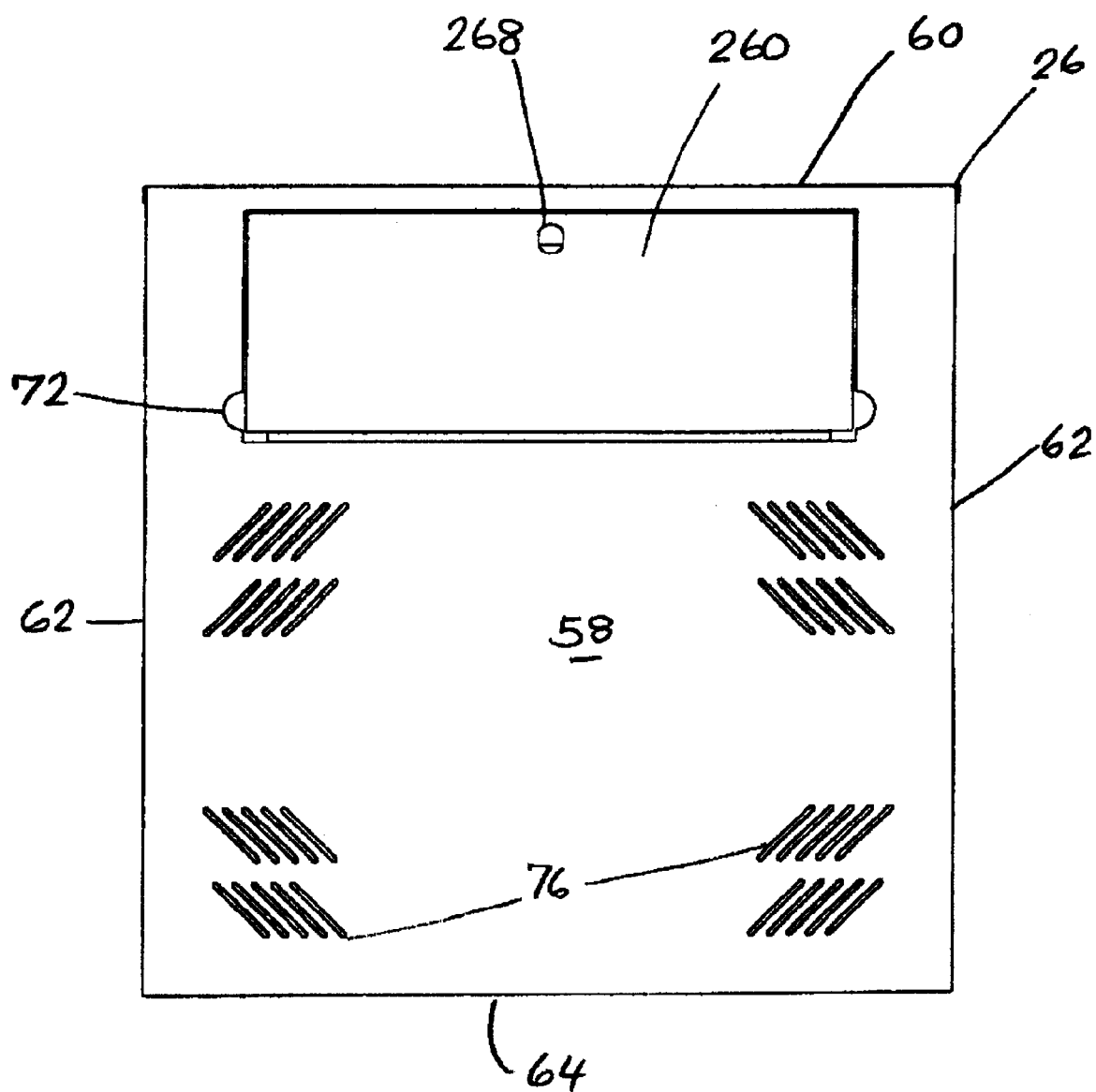
FIG. 4 is top plan view of the cabinet shown in FIG. 1, with the top door closed.
Figure 5:
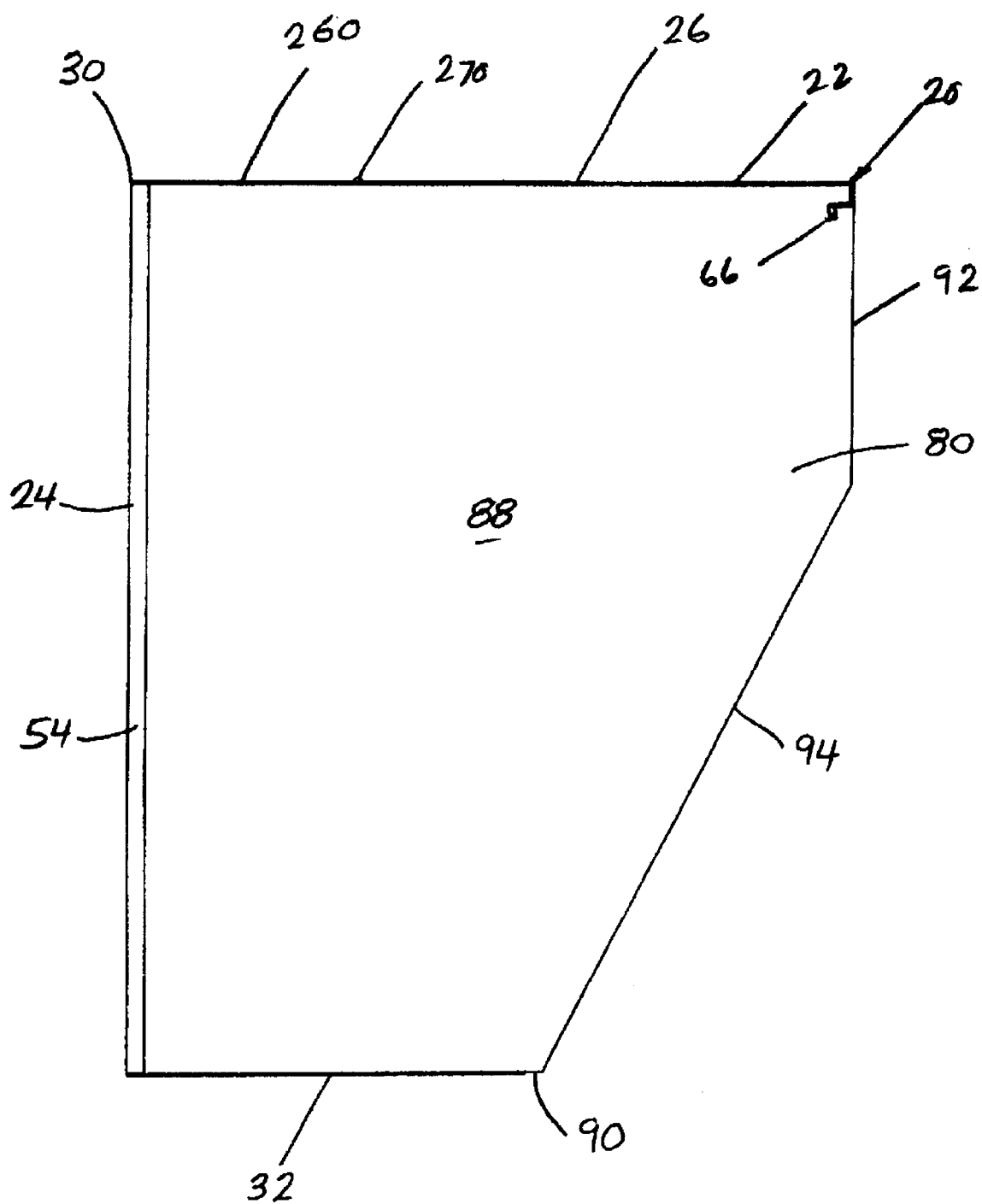
FIG. 5 is a side elevation of the left side of the security cabinet as seen in FIG. 1.
Figure 6:
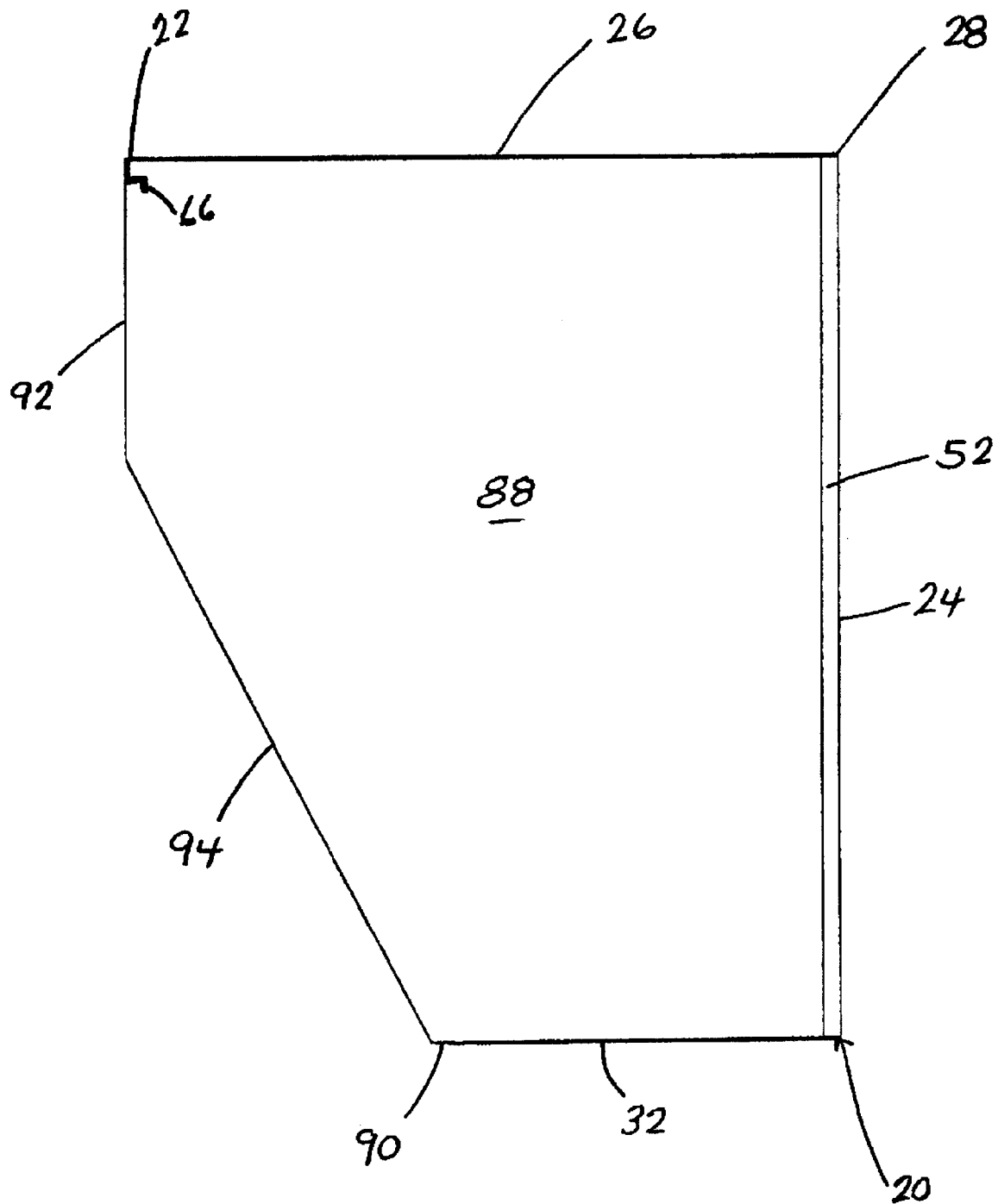
FIG. 6 is a side elevation of the right side of the security cabinet as seen in FIG. 1.

The top panel of 26 (FIGS. 2 and 4) is also substantially square in shape and has a depth and width the same as the depth and width of the top of the housing 22. The top panel has a flat central portion 58, a plain rear edge 60, plain side edges 62, a downwardly extending front flange 64, and a stop flange 66 (FIGS. 11 and 12) extending downwardly from the central portion 58 in rearwardly adjacent, closely spaced relation to the front flange 64. The central portion 58 (FIG. 2) of the top panel has a rectangular access opening 70 adjacent to the rear edge and semicircular cable holes 72 adjacent to the front corners of the access opening. L-shaped doorstops 74 extend downwardly from the central portion on opposite sides of the access opening. The central portion also provides four sets of venting slots 76 in a square relationship in front of the access opening.

The side panels 28 and 30 are best shown in FIGS. 1, 2, 5 and 6. The side panels are mirror images of each other so only one will be described in detail with the same reference numerals applying to the other side panel. Thus, each side panel has a central portion 80, a vertical inwardly extending rear flange 82, a horizontal inwardly extending top flange 84, inside and outside surfaces 86 and 88, and a horizontal inwardly extending bottom flange 90. The length, i. e., depth, of the top flange is the same as the depth of the top panel 26, and the length or height of the rear flange is equal to the height of the back panel 24.

Each side panel 28 and 30 (FIG. 2) also has upper and lower, front, reversely bent flanges 92 and 94, respectively. The upper front flange extends vertically downwardly from the top flange in generally parallel relation to the rear flange of the side panel, and the lower front flange extends downwardly and rearwardly from the upper front flange to the bottom flange in obtuse angular relation to the bottom flange. The angle between the bottom flange and the lower front flange in the preferred embodiment is approximately one hundred eighteen degrees, although this angle is not critical. It is important, however, that the lower front flange extends downwardly and rearwardly as shown in the drawings for both functional and aesthetic reasons, namely, to provide a more compact structure of reduced weight, to facilitate use of the cabinet 20 as will be seen, but also to enhance the design of the cabinet as a piece of furniture. The central portion 80 and the flanges of the side panels have a plurality of assembly holes, several of which are indicated by the numeral 96 in the figures, although not all are shown since an explanation of how a few are used will suffice for those not shown.

Figure 8:
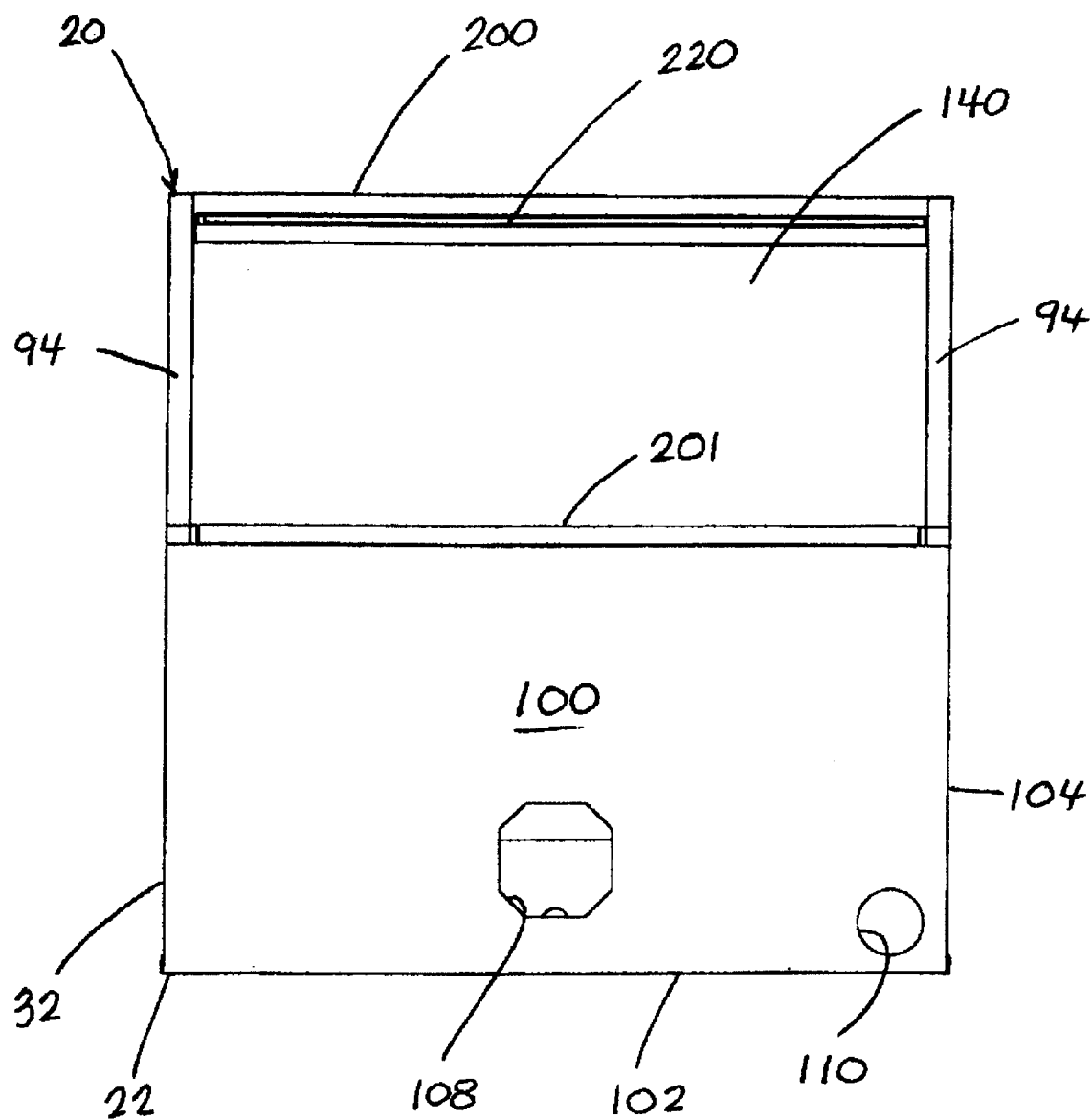
FIG. 8 is a bottom plan view of the security cabinet with both front doors closed.

The bottom panel 32 (FIGS. 2 and 8) is rectangular in shape and has a depth and width the same as the bottom of the housing 22. The bottom panel includes a flat central portion 100, a plain rear edge 102, plain side edges 104, and a front flange 106 that extends upwardly from the central portion and then rearwardly in a reverse or wrap-around bend like flanges 92 and 94. The central portion also has a rear fan hole 108 and an auxiliary cable hole 110 in one of the rear corners. As with the other panels described above, the bottom panel also has a plurality of assembly holes 112, in this panel being located in the central portion along the rear and side edges and around the fan hole.

With reference to FIGS. 2 and 7A, a triangular side panel insert 120 is fastened to the inside surface 86 of each side panel 28 and 30, only one of these inserts being shown in FIGS. 2 and 7, but with the other insert being a mirror image of the insert shown and bearing the same numerals. Each insert includes a horizontal, outwardly extending, upper spacer flange 122, a vertical inwardly extending rear flange 124 that serves as a door stop in a manner to be described, and a plain front edge 126 that is complementary to the angular relationship between the bottom and lower front flanges 85 and 94 of its side panel 28 or 30. Also, this insert has a rear upper cutout 128 at the juncture of its upper spacer flange and rear flange for a purpose to be described. A plurality of assembly holes 130 are provided in the central portion along the front edge 126 and along the rear flange.

The security cabinet 20 also includes a top shelf 140 (FIGS. 2 and 16) that is approximately square in plan view and has a depth and a width approximately the same as the depth and width of the top of the housing 22. This shelf has a central portion 142, vertically downwardly extending side flanges 144 each having mounting notches 146, vertically downwardly extending front and rear flanges 148 and 150, and a rear rectangular access opening 152 in the central portion alongside the rear flange.

In addition, the cabinet 20 includes a smaller but rectangular intermediate shelf 160 (FIGS. 2 and 16) that has a vertically upwardly extending rear flange 162, downwardly extending side flanges 164 each providing hanging apertures 166, and a downwardly extending front flange 168. The width of the intermediate shelf is approximately the same as the width of the housing 22 or the top shelf 140, but the depth of the intermediate shelf is approximately one-third the depth of the top shelf.

Still further, the cabinet includes a bottom shelf 172 (FIGS. 2 and 16) similar in size and shape to the intermediate shelf 160. The bottom shelf has a vertically upwardly extending rear flange 174, downwardly extending side flanges 176, and a downwardly extending front flange 178. The central portion has a front locking slot 180 adjacent to the front flange and centrally located in the bottom shelf.

Elongated door mounts 190 (FIGS. 2, 7B, 14, and 16) are secured to the inside surfaces 86 of each side panel 28 and 30 preferably by welding. Only one of these door mounts is shown in FIG. 2, but from FIG. 16 it will be understood that another door mount is similarly attached to the inside surface of the other side panel. Each door mount includes an elongated block 192 approximately one-third the depth of the top of the housing 22 and having an elongated slot 194 that serves as a track extending fore and aft in the cabinet 20.

Further, an elongated ledge 196 is secured to the block immediately below and in parallel relation to the track. Each block and its attached ledge is secured to the inside surface of its side panel so that the track is aligned with the cutout 128 of the insert 120 attached to its associated side panel and rearwardly of the cutout. The tracks and the ledges are thus horizontally disposed, are parallel to the top and bottom flanges 84 and 85 of the side panels 26 and 28 and are disposed midway of the front and rear flanges 92 and 82 of the side panels 28 and 30.

The security cabinet 20 is easily assembled from the parts described above and shown in FIG. 2 into the condition shown in FIG. 1. The side panels 28 and 30 are assembled with the back panel 24 so that the side flanges 52 and 54 are fitted inside the rear flanges 82 of the side panels. These overlapping side and rear flanges are interconnected by fasteners 197 extending through the assembly holes 56 and 96 in the central portion 40 and in the rear flanges 82, respectively. The fasteners used for this purpose are screws having shanks extending through the overlapping flanges, heads that are flush with the outside surfaces 88 of the side panels, and nuts threaded on the shanks inside the cabinet. It is important to note here that the heads of these fasteners are flat, plain and smooth without slots and are in intimate engagement with the outside surfaces 88 so that upon painting, they are obscured and cannot be seen except upon very close inspection. For this reason, none of the views show the fasteners since in its completed condition, the fasteners are virtually invisible under the paint; however, to illustrate a fastener, the back panel is broken away in the top left corner in FIG. 3. Not only are the heads obscured, they are not accessible and could only be engaged by bending in the side walls of the cabinet and destroying the same, if an attempt were made to break into the cabinet.

The top panel 26 (FIGS. 1 and 2) is assembled with the back panel 24 by placing the rear edge 60 in overlapping relationship to the top flange 48 whereupon these overlapping parts are again secured with the fasteners 197. In this regard, it is noted that the locking flange 49 is located along the rear edge of the top panel adjacent to the access opening 70 and midway between the doorstops 74. Also, the top flanges 84 of the side panels 28 and 30 fit under the side edges 62 of the top panel and are fastened thereto by the fasteners 197.

The bottom panel 32 (FIGS. 1 and 2) is assembled to the back panel 24 and the side panels 28 and 30 so that the side edges 104 of the bottom panel are above and in overlapping relationship to the bottom flanges 85 of the side panels, whereupon these overlapping flanges are connected by the fasteners 197. The rear edge 102 of the bottom panel overlaps the bottom flange 50 of the back panel 24 and is secured thereto by the fasteners 197. As thus assembled, the back, top, side and bottom panels are all securely interconnected to form the cabinet 20 shown in FIG. 1.

Figure 14:
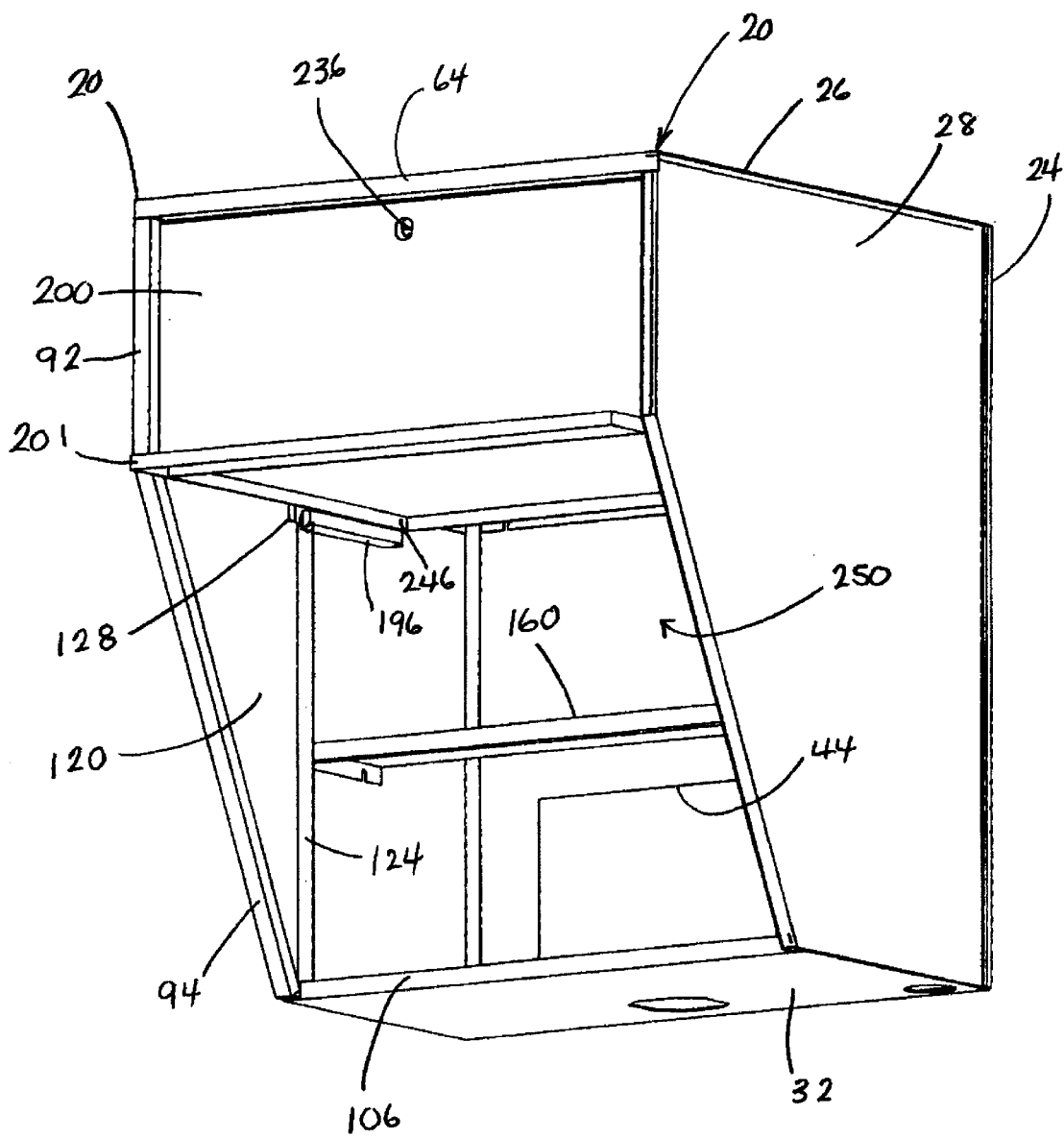
FIG. 14 is a view similar to FIG. 13 except that the lower door front door is open and in its horizontal position, it being noted that the lower compartment is shown empty except for shelves.
Figure 15:
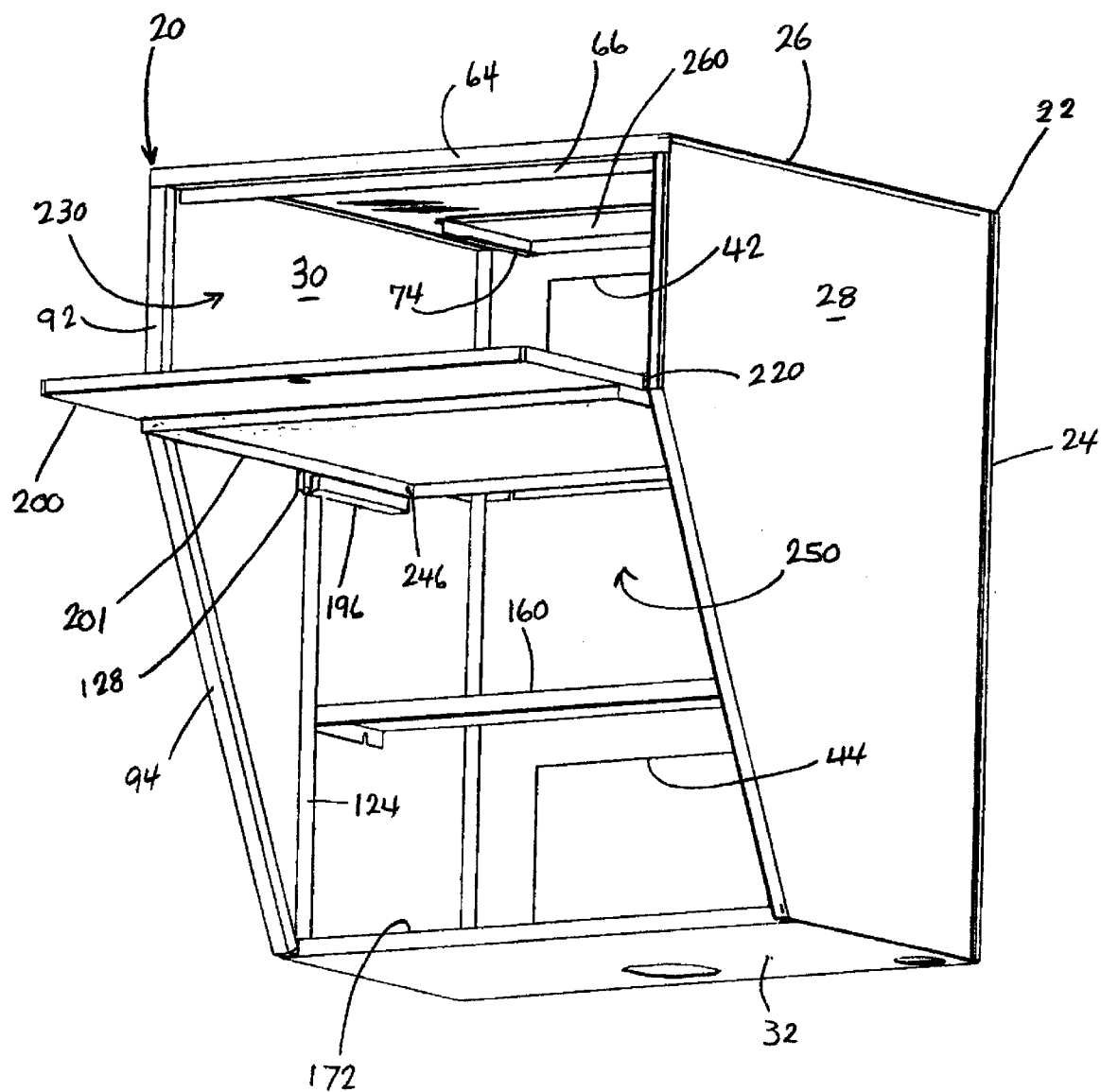
FIG. 15 is a view similar to FIGS. 13 and 14 except that both front doors are open and in their horizontal positions, with the lower front door partially extended enough to support the upper front door as in FIGS. 10, and 11, and with both the upper and lower compartments empty except for the shelves.
Figure 16:
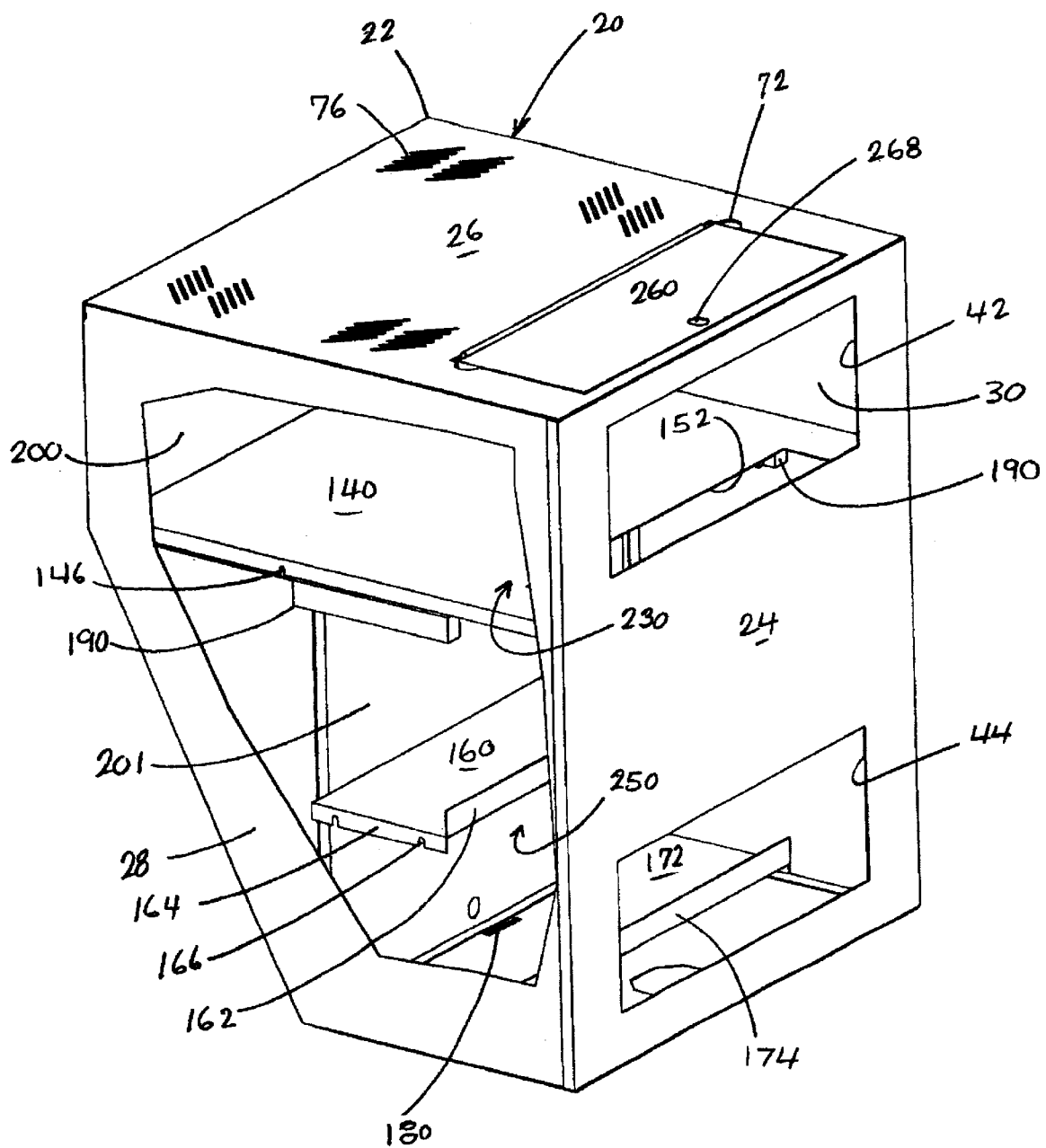
FIG. 16 is a rear isometric view of the cabinet from a vantage point looking down on the rear upper right corner of the cabinet with all three doors closed but with the right side wall being broken away to show interior parts of the cabinet and with the cabinet being empty except for the three shelves.

The top shelf 140 (FIGS. 2 and 16) is positioned within the housing 22 in a horizontal position in spaced parallel relation to the top and bottom panels 26 and 32 although located relatively closer to the top panel and above the blocks 192. The side flanges 144 of the top shelf are in flat engagement with the inside surfaces 86 of the side panels 28 and 30 and are secured thereto by fasteners, not shown, extending through the side panels and into the mounting notches 146 of the top shelf. The fasteners for the top shelf are preferably of the type having male and female shanks threadably interconnected with flat, plain and smooth heads on both ends so that the heads against the outside surfaces of the side panels are flat, plain and smooth as with the fasteners 197. It is noted that the top shelf occupies the entire horizontal cross-sectional area of the housing so that its rear flange 150 is in contact with the inside surface of the back panel 24 and its front flange 148 is generally in alignment with the junction between the upper and lower front flanges 92 and 94 of the side panels. However, as noted, the top shelf is above the tracks 194 and ledges 196, although the latter are immediately underneath the top shelf, as best seen in FIGS. 14 through 16.

Figure 9:
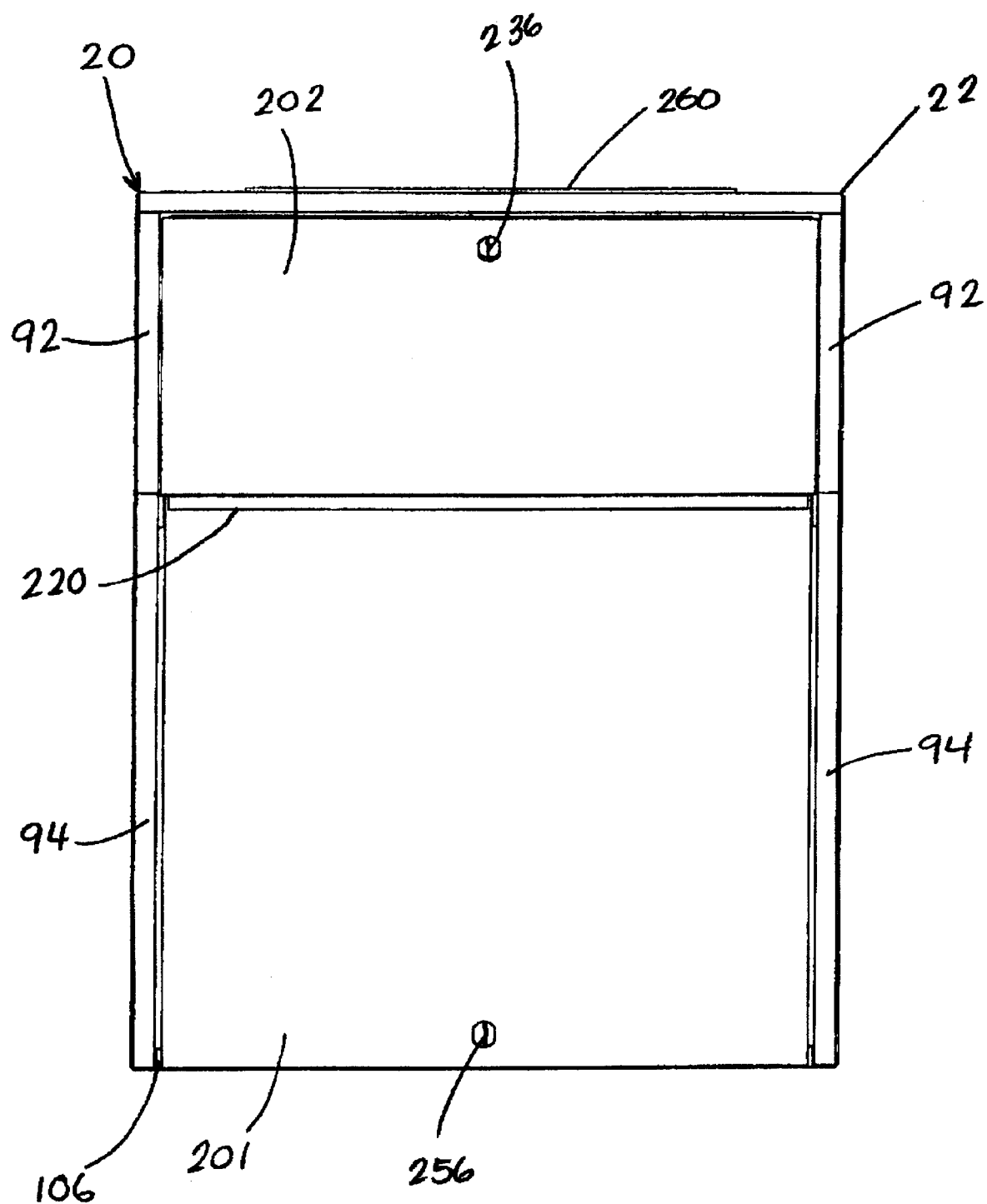
FIG. 9 is a front elevation of the security cabinet with all three doors closed.
Figure 10:
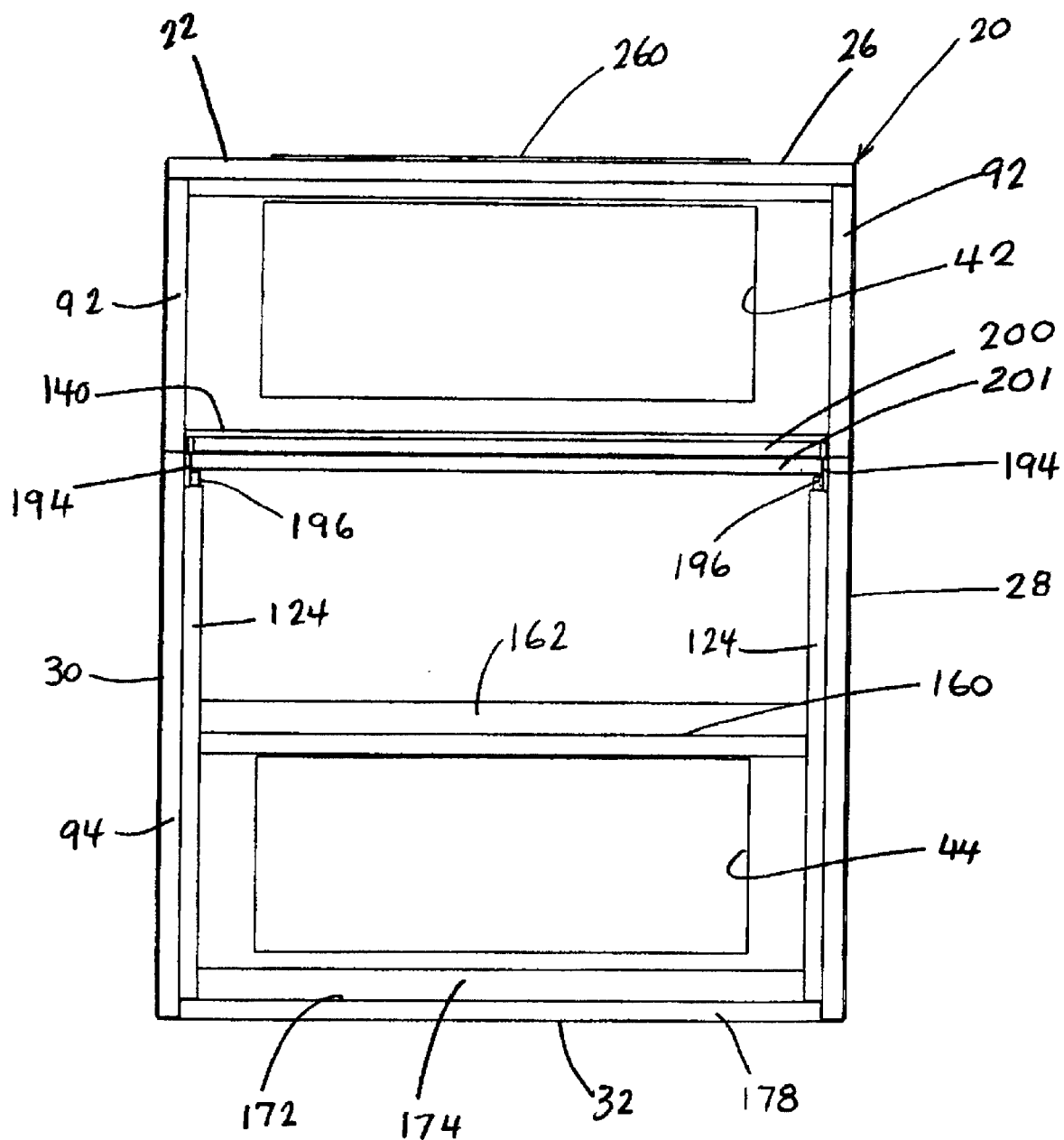
FIG. 10 is a front elevation of the security cabinet with both front doors open, with the cabinet empty, and with the upper front door supported by the lower front door in its horizontal position, thereby showing the back panel with its two openings.

The cabinet 20 also includes upper and lower front doors 200 and 202 (FIGS. 1 and 2) respectively. The upper front door includes an outside rectangular panel 202, preferably of solid construction and of a thickness greater than the various panels 24 through 32. The upper front door has an upper edge 204, side edges 206, and a lower flange 208 serving as a hinge plate. The upper front door also includes a rectangular inside cover 210 (FIG. 9A) having peripheral flanges 212. The outside panel and the inside cover are assembled so that the flanges 212 fit around the upper, side and lower edges of the outside panel and so that the lower flange projects below the cover. The upper front door has a locking hole 214 extending through both the outside panel and the inside cover adjacent to the upper edge 204. An upper door hinge 220 preferably includes a fixed plate attached to the central portion 142 of the top shelf 140 along the front flange 148 and a moveable plate attached to the lower flange 208 of the upper front door. Eyelets, not shown, on these plates are interfitted and aligned, and an elongated pin, not shown, extends through the aligned eyelets to establish the hinge. Other hinge constructions well-known in the art may be employed. A lock 236 in the hole 214 enables the upper front door to be locked with its locking member engaging the back of the stop flange 66 in the locked position. The top, side and back panels 26, 28, 30 and 24; the top shelf 14; and the upper front door form an upper compartment 230.

The lower front door 201 (FIGS. 1 and 2) is of generally rectangular shape and has a height two to three times as high as the upper front door 200. Both doors have a width substantially the same as the width of the housing 22 between the side panels 28 and 30. The lower front door has an upper edge 240, side edges 242, and a lower edge 244, and trunnions 246 project outwardly from the side edges of the lower front door adjacent to its upper edge, as shown in FIGS. 2 and 14. The lower front door also has a locking hole 246 adjacent to its lower edge and centrally located between its side edges.

The trunnions 246 (FIGS. 2 and 14) project outwardly from the lower front door 201 and slidably fit in the tracks 194 of the door mounts 190. As such, the lower front door is mounted for movement manually both forwardly and rearwardly in the housing 22 along the tracks while slidably engaging and being supported on the ledges 96. The lower front door is also mounted or hung for pivotal movement between open and closed positions when the trunnions are within the cutouts 128 at the front of the tracks. When these trunnions are so disposed in the cutouts, the front door, if manually released, will swing down into a pendent position and enclose a lower compartment 250 in the cabinet 20. In this closed position, the side and lower edges 242 and 244 of the lower front door mate against the rear flanges 124 of the inserts 120 and against the front flange 106 of the bottom panel 32, respectively, all serving as doorstops.

Figure 11:
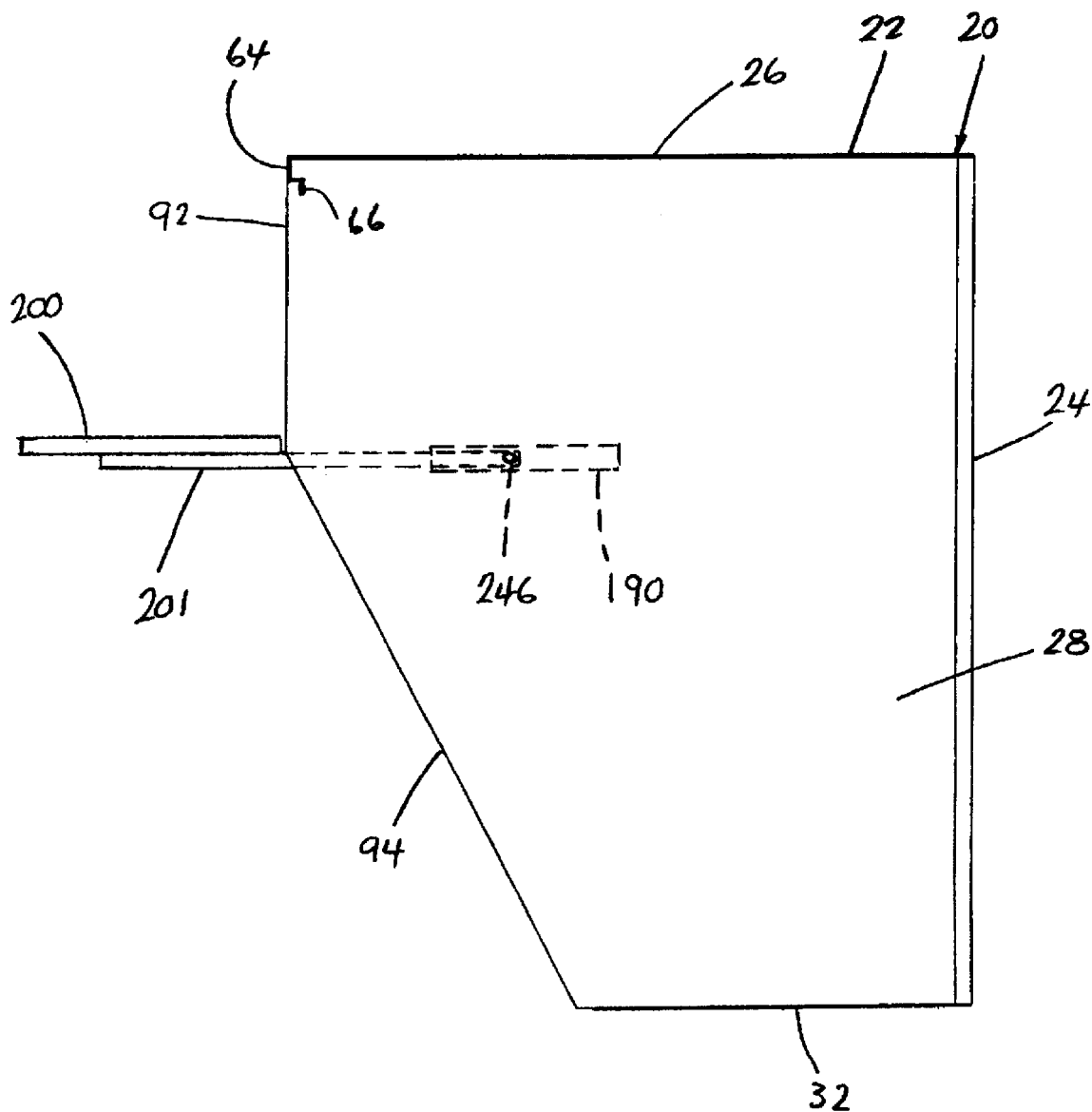
FIG. 11 is a side elevation similar to FIG. 6 but with the front doors opened and with the lower front door supporting the upper front door as seen in FIG. 10.
Figure 12:
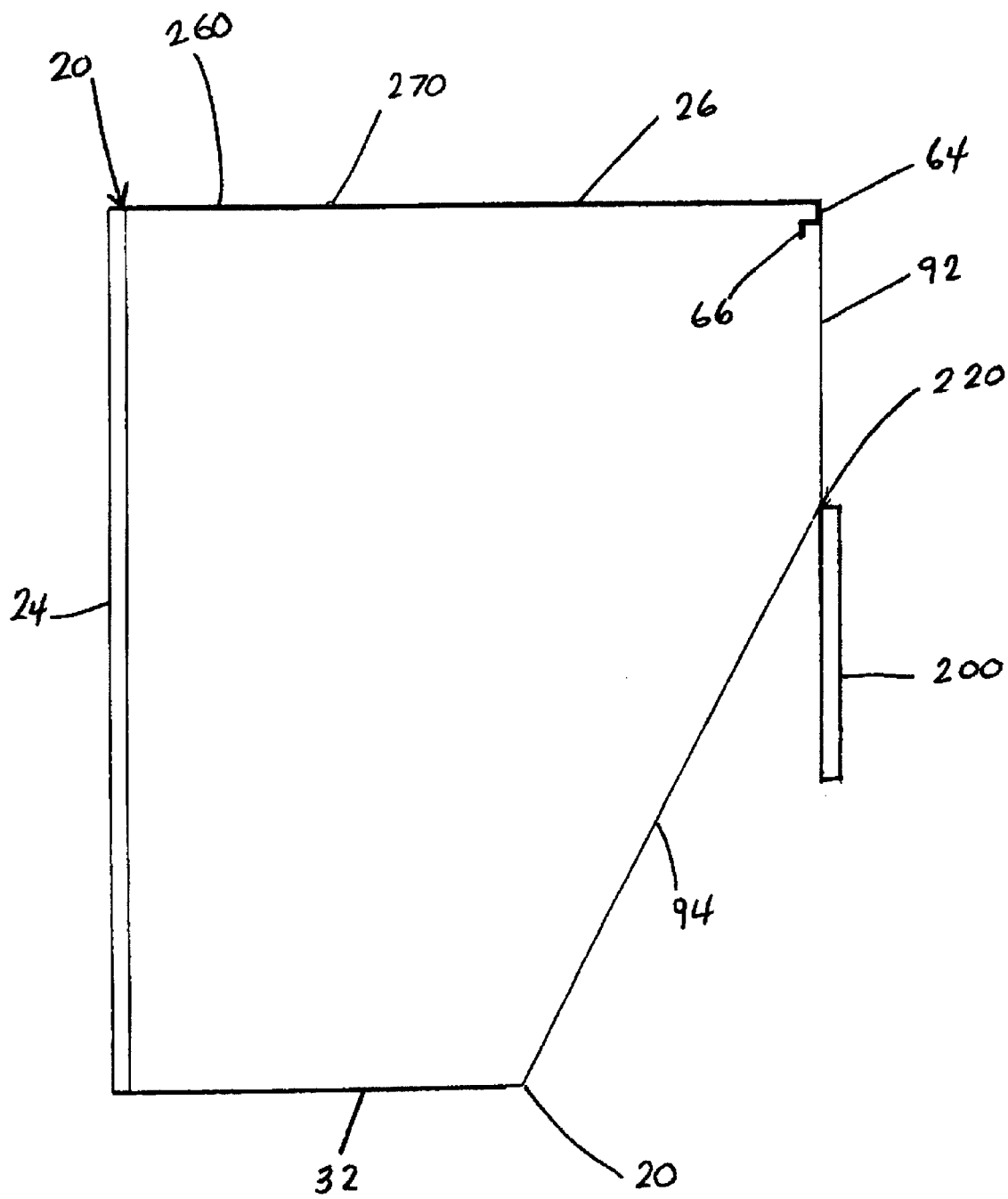
FIG. 12 is a side elevation similar to FIG. 5 with the lower front door closed or open and in fully retracted position but in any event not seen and with the upper front door hanging from its e in pendent open position.

Thus, the lower front door, when closed (FIGS. 1, 13, 16 and 17), is in a firm position in parallel relation to the back panel 24. A lock 256 is positioned in the lock hole 246 and has a locking member, not shown, engageable with the bottom shelf 172 in the locking slot 180 to lock the lower front door closed. When unlocked, however, the lower front door can be pivoted upwardly into a horizontal position where it can be slid rearwardly along the tracks 194 and the ledges 196 back within the housing 22 to its rearwardmost retracted position as can be visualized in FIGS. 11, 14 and 15. Rearward sliding movement of the lower front door is limited by engagement of the trunnions with the rear ends of the tracks 194. From its rearwardmost position, the lower front door can be manually pulled forwardly on the ledges and tracks until the side edges 242 are forwardly of the ledges and in the cut-outs 128, whereupon the door can be pivoted downwardly into its closed position. When the lower front door is in its open position and supported by the ledges 196 and pulled partially out from its rearwardmost position, it serves as a support for the upper front door 200 when the latter is in its open position, as illustrated in FIG. 11.

Figure 13:
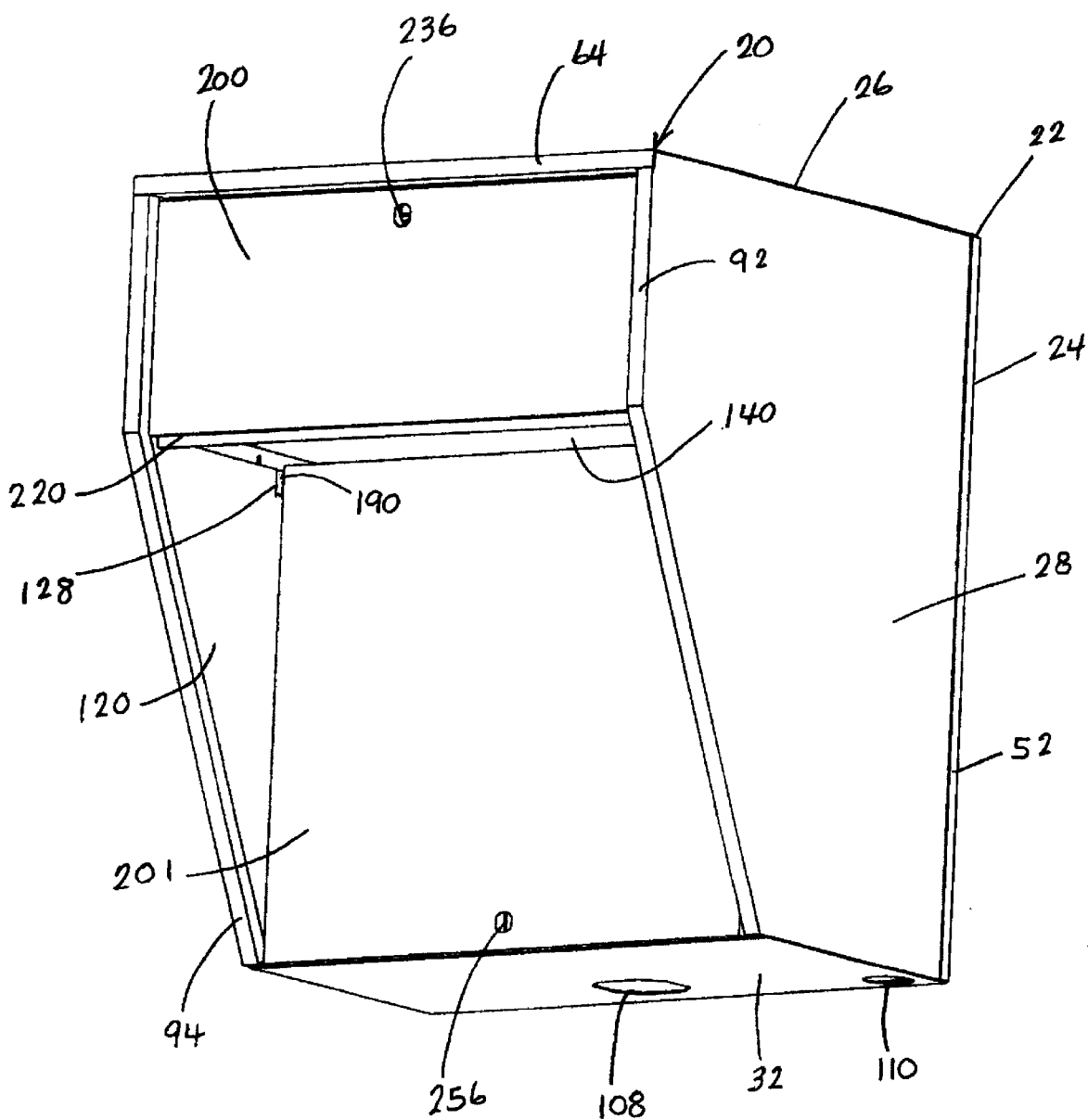
FIG. 13 is a front isometric view of the security cabinet with all three doors closed and from a vantage point looking up at the right lower front corner of the cabinet.

The upper front door 200 is thus mounted for pivotal movement between a closed position, as shown in FIGS. 1, 13 and 14 and an open position, as shown in FIGS. 10, 11, 12, and 15. In its closed position, the upper front door engages the stop flange 66 (FIG. 15) so as to locate the upper front door in a firm parallel relationship to the back panel 24.

In its open position, the upper front door 200 can hang down from the hinge 220 or be supported by the lower front door 201. To allow the upper front door to hang down in a pendent position (FIG. 12), the lower front door must either be in its rearwardmost retracted position or closed. Otherwise, the upper front door will be stopped in a horizontal position and rest on, and be supported by, the lower front door.

The cabinet 20 also includes a rectangular top door 260 (FIGS. 1, 2 and 4) having a downwardly and forwardly extending front flange 262, downwardly extending side flanges 264, a rear edge 266, and a locking hole 268. The top door is hinged to the top panel 26 by a hinge 270 so that the top door can pivot between a closed position, as shown in FIG. 1, and an open position lying back, flat against the top panel 26, not shown, but easily visualized from the various figures. In the closed position, a lock 272 in the locking hole 268 has a locking member, not shown, that extends under the locking flange 49 on the back panel 24 in order to secure the top door in its closed position.

Figure 17:
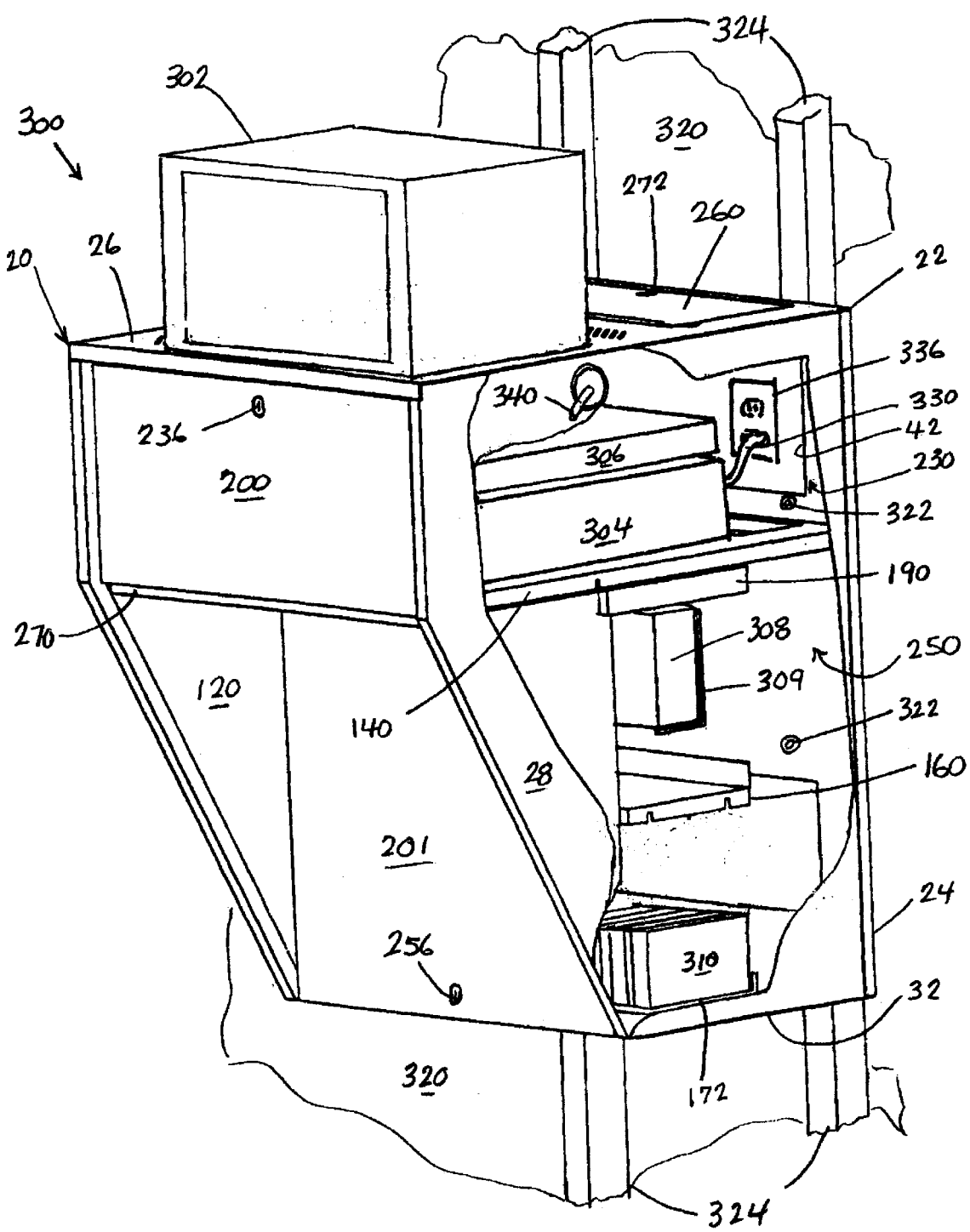
FIG. 17 is a right front isometric view of the security system of the present invention including the security cabinet of FIGS. 1 through 16 with all three doors closed and locked and with the cabinet shown attached to the wall of a building with a TV monitor secured to the top wall of the cabinet, and with one of the side walls broken away to show interior parts of the security cabinet and certain monitoring equipment of the subject security system positioned in the cabinet.

The security system of the present invention is generally indicated by the numeral 300 in FIG. 17. The system includes the cabinet 20 plus various items of security equipment housed within or mounted on the cabinet. That is, the security system includes a TV monitor or display 302 secured on the top panel 26 by fasteners, not shown but of various types and well known, extending through the vent slots 76 into threaded sockets in the bottom of the monitor. As such, these fasteners are inaccessible to unauthorized persons when the upper and top doors 200 and 260 are closed and locked. The security system also includes a videotape recorder or VCR 304 supported on the top shelf 140 in the upper compartment 230, a multiplexer 306 rested on the VCR, a 24-volt power supply 308 supported on the back panel 24 by bracket 309 in the lower compartment 250 and thus under the top shelf, and videotapes 310 stored on the intermediate and bottom shelves 160 and 172 and thus also within the lower compartment.

The cabinet 20 is secured to the wall 320 (FIG. 17) of the building in which the security system 300 is used by extending fasteners 322 through the mounting holes 46 of the back panel into studs 324 of the wall or by using anchor or toggle bolts if studs are not available. When mounted in this manner, the top and bottom panels 26 and 32 as well as the three shelves 140, 160 and 172 are all horizontal. A power cable 330 extends from the VCR 304 through the upper cable opening 42 of the back panel so as to plug into a 110-volt outlet 336 in the wall of the building. Coaxial and power cables, generally indicated at 340, extend from the multiplexer and the 24-volt power supply, respectively, through the upper cable opening 42 and in the wall for connection to video cameras, not shown, located at strategic positions around the building. A cooling fan, not shown, is mounted in the fan hole 108 of the bottom panel 100 in order to blow cooling air up through the cabinet for exhaust through the vent slots 76.

In use, the security cabinet 20 (FIG. 17) of the subject security system 300 is located in a convenient place in the building to be monitored, usually in the corner of an office or in a separate room not generally accessible to customers but only to employees of the business and perhaps only key employees, such as the manager. The overall design of the cabinet allows it to be used as a piece of furniture that compliments an overall office plan and arrangement. Before attaching the cabinet to the wall 320, the 110-volt outlet 336 is installed at a height of about five feet off the floor, and the coaxial and power cable 340 from the video cameras, not shown, are brought out of the wall adjacent to and at about the same elevation as the 110-volt outlet. The housing 22 is then secured to the wall 320 as above described, so that the 110-volt outlet and the cables 340 are disposed within the upper opening.

With the upper and lower front doors 200 and 201 open, the VCR 304 and multiplexer 306 are positioned in the upper compartment on the top shelf 140, as shown in FIG. 17. The power supply 308 is mounted on the back panel 24 in the lower compartment. Then, the intermediate shelf 160 is releasably supported in the lower compartment. Also, the TV monitor 302 is mounted on and secured to the top panel 26. The necessary connections are made with the cables 330 and 340, the VCR is loaded with a videotape, and a supply of videotapes 310, both those already recorded as well as unrecorded tapes, are located on the intermediate and bottom shelves 160 and 172. Thereafter, the upper front door 201, the lower front door 201, and the top door 260 are closed and locked.

In the described condition of the security system 300 (FIG. 17), theft of or tampering with the TV monitor 302, the VCR 304, the multiplexer 306, the power supply 30, the videotapes 310, or the cord 330 or cables 340 is extremely difficult and practically impossible. The TV monitor is bolted to the cabinet 20 from within the cabinet, and the other equipment, cables, and cord are accessible only within the upper or lower compartments 230 and 256, which are locked by the upper and lower front doors 200 and 201. Without the keys to the locks, it would be necessary for a thief or unauthorized user to use a crowbar or a sledge hammer to try to remove the cabinet from the wall 320 or to open the doors 200, 201 or 260. Usually, this security equipment is placed in such a location or the business is small enough that such an obvious attempt to remove it would be noticed. Moreover, one of the video cameras, not shown, in the system would be trained on the cabinet so that anyone attempting such an action would be recorded. The top panel 260 may be opened to afford easy access to the compartment for servicing and maintenance.

In summary, the various items in the security system 300 that are protected from theft or tampering include the twenty-four-hour VCR 304, the multiplexer 306 which feeds the VCR with information from one to sixteen remote cameras, not shown, the 110-volt power outlet 336, the 24-volt power supply 308 that supplies the remote cameras with power, the coaxial and power cables 340 that feed information to the multiplexer from the remote cameras, the VCR tapes 310, and the TV monitor 302. The security system has several advantages apart from its basic advantage of providing real security for the monitoring equipment in a security system that does not involve security personnel continually watching the equipment. These other advantages include ease of assembling the cabinet 20; the removable intermediate shelf 160 that allows access for mounting and servicing the 24-volt power supply 308; the top door 260 that allows access to the rear of the multiplexer 306 as well as the VCR 304 for installation and any required maintenance; the convergence of the upper and lower front doors 200 and 201 for ease of accessibility during installation and maintenance; the use of the upper front door when supported by the lower front door as a shelf to assist during maintenance; the mounting of the housing 22 either to the studs, as 322, inside a cavity of the wall 320, or to the drywall itself with toggle or anchor bolts; the wide openings 42 and 44 in the back panel 24 that allow the housing to fit over the coaxial and power cables 340 as well as the 110-volt outlet 336; and the hole 110 in the bottom panel 32 that allows for retrofit of cables or for accommodating a power or camera cable should the need arise. Still further, the attachment of the back panel 24 to the wall 320 serves as a fulcrum for the top panel 26, acting as a cantilever and supporting the heavy monitor 302, and also the top shelf 140, acting as a cantilever and supporting the heavy VCR.

Although a preferred embodiment of the present invention has been shown and described, various modifications and substitutions may be made thereto without departing from the spirit and scope of the present invention. Accordingly, it is to be understood that the present invention has been described by way of illustration and not limitation.

What is claimed is:

1. A cabinet, comprising a housing providing an upper compartment having a front opening and a lower compartment under the upper compartment having a front opening spaced rearwardly from the front opening of the upper compartment;

an upper door mounted on the housing in a substantially vertical closed position over the front opening of the upper compartment; and a lower door mounted on the housing in substantially vertical closed position over the front opening of the lower compartment wherein the lower door is in substantially parallel rearwardly spaced relation to the upper door, the doors being moveable from their closed position to open positions in overlapping relationship with each other and lying generally in planes that pass between the upper and lower compartments, the lower door in its open position being movable inwardly relative to the housing into a cantilevered position projecting outwardly from the housing, the upper door in its open position being supported by the lower door in its cantilevered position.

2. The cabinet of claim 1, wherein the doors are pivotal on substantially horizontal axes;

wherein said axes lie substantially in the planes of their respective doors; and wherein there are supports in the housing supporting the lower door in its open position with the upper door lying on and being supported by the lower door.

3. A cabinet, comprising
a housing providing an upper compartment having an upper opening enabling access to the upper compartment and a lower compartment having a lower opening spaced below the upper opening and enabling access to the lower compartment;
an upper door mounted on the housing in a substantially vertical closed position over the upper opening; and
a lower door mounted on the housing in substantially vertical closed position over the lower opening,
the doors being moveable from their closed position to open positions in overlapping relationship with each other and lying generally in planes that pass between the upper and lower compartments, the lower door in its open position being movable in or substantially parallel to said plane inwardly relative to the housing into a cantilevered position projecting outwardly from the housing, the upper door in its open position being supported by the lower door in its cantilevered position.

4. The cabinet of claim 3,
wherein the doors are pivoted on substantially horizontal axes;
wherein said axes lie substantially in the planes of their respective doors; and
wherein there are supports in the housing supporting the lower door in its open position with the upper door lying on and being supported by the lower door,
wherein pivots define said axes, and
wherein said pivots are movable in the open position of the lower door into and out of a cantilevered position projecting outwardly from the housing.

5. The cabinet of claim 3,
wherein there are tracks on the inside of the housing;
wherein the lower door is pivotally and slideably supported on the tracks for pivotal movement on the tracks between open and closed positions and for slideable movement along the tracks in its open position; and
wherein the upper door is movable between a closed position in substantially parallel relation to the back panel and enclosing the upper compartment and an open position resting on the lower door when the lower door is in its open position supported on the tracks.

6. A cabinet, comprising
a housing providing an upper compartment having an upper opening enabling access to the upper compartment and a lower compartment having a lower opening spaced below the upper opening and enabling access to the lower compartment;
an upper door mounted on the housing in a substantially vertical closed position over the upper opening and pivoted on a first substantially horizontal axis for movement in one direction about the first axis into open position; and
a lower door mounted on the housing in substantially vertical closed position over the lower opening and pivoted on a second substantially horizontal axis adjacent to and parallel to the first axis for movement in the opposite direction about the second axis into open position, the lower door in its open position being movable along a path, that is angularly related to the plane of the lower door in its closed position, inwardly relative to the housing into a cantilevered position projecting outwardly from the housing, the upper door in its open position being supported by the lower door in its cantilevered position.

7. The cabinet of claim 6,
wherein there are supports in the housing supporting the lower door in its open position with the upper door lying on and being supported by the lower door.

8. A cabinet, comprising:
a housing having a back adapted to be disposed in substantially vertical position and having vertically spaced, top, bottom and intermediate panels projecting outwardly from the back, the top and intermediate panels projecting farther outwardly from the back than the bottom panel, horizontally spaced side panels projecting outwardly from the back and interconnected by the top and bottom panels, the side panels having lower front edges extending upwardly from the bottom panel in obtuse angular relation to the bottom panel and upper front edges extending upwardly to the top panel from intersections with the lower front edges, the intersections being adjacent to the intermediate panel, the side, top and intermediate panels defining an upper compartment and the side, intermediate and bottom panels defining a lower compartment; and
an upper door pivoted adjacent to said intersections and movable between open and closed positions relative to the upper compartment; and
a lower door mounted on the housing, movable between open and closed positions relative to the lower compartment, and being further movable in its open position inwardly and outwardly of the lower compartment to and from a supporting position in which it is cantilevered from the lower compartment, the upper door being supported by the lower door in the open position of the upper door and the cantilevered supporting position of the lower door.

9. The cabinet of claim 8,
wherein top and intermediate panels extend farther out from the back panel than the bottom panel.

10. The cabinet of claim 9,
wherein the doors are substantially parallel in their closed positions.

11. The cabinet of claim 8,
wherein the upper door is pivoted on an axis that is located approximately at said intersections; and
wherein the lower door mounted on the housing for pivotal movement on an axis that lies in approximately the same plane as the pivotal axis of the upper door.

12. The cabinet of claim 11,
wherein the axis of the lower door is movable fore and aft in the housing.

13. The cabinet of claim 8,
wherein there are tracks on the inside of the side panels in the lower compartment;
wherein the lower door is pivotally supported on the tracks for slidable movement along the tracks in its open position;
wherein the upper door is supported on the tracks and projects outwardly from the cabinet in its open position; and
wherein the upper door is movable between a closed position in substantially parallel relation to the back panel and enclosing the upper compartment and an open position resting on the lower door in its open position supported on the tracks.

14. The cabinet of claim 13,
wherein the panels of the housing are interconnected by fasteners having flat heads flush with the outside surfaces of the panels.

15. The cabinet of claim 8,
wherein the upper door is supported by the lower door in the open position of upper door.

16. A cabinet, comprising:

a housing having a back support panel adapted to be disposed in substantially vertical position and having vertically spaced, top, bottom and intermediate panels projecting outwardly from the back panel, horizontally spaced side panels projecting outwardly from the back panel, the side, top and intermediate panels defining an upper compartment and the side, intermediate and bottom panels defining a lower compartment;

fasteners on the back panel adapted to connect the back panel to the wall of the building;

upper and lower doors attached to one or more of the panels and movable respectively between open and closed positions relative to the upper and lower compartments, the lower door being spaced inwardly from the upper door in the closed positions of both doors; and locks on the upper and lower doors, wherein the doors are pivoted for movement between their open and closed positions on axes that are substantially parallel to each other and in substantially the same plane as the intermediate panel , and wherein the pivot axis of the lower door is movable in the open position of the lower door between a pivot position in which the lower door is movable between said open and closed positions and a non-pivot supporting position in which the lower door is cantilevered from the housing and supports the upper door.

17. A cabinet, comprising a housing providing an upper compartment having an upper opening enabling access to the upper compartment and a lower compartment having a lower opening spaced below the upper opening and enabling access to the lower compartment;

an upper door mounted on the housing in a substantially vertical closed position over the upper opening and pivoted on a first substantially horizontal axis for movement in one direction about the first axis into open position; and a lower door mounted on the housing in substantially vertical closed position over the lower opening and pivoted on a second substantially horizontal axis adjacent to and parallel to the first axis for movement in the opposite direction about the second axis into open position, the axis of the lower door in its open position being movable along a path, that is angularly related to the plane of the lower door in its closed position, into a cantilevered position projecting outwardly from the housing, the upper door in its open position being supported by the lower door in its cantilevered position.

* * * * *